United States Patent [19]

Izumi

[11] Patent Number: 4,783,827
[45] Date of Patent: Nov. 8, 1988

[54] SERIAL DATA PROCESSING APPARATUS

[75] Inventor: Akio Izumi, Yokosuka, Japan

[73] Assignee: Fuji Electric Co., Ltd., Kawasaki, Japan

[21] Appl. No.: 867,471

[22] Filed: May 27, 1986

[30] Foreign Application Priority Data

May 27, 1985 [JP] Japan .................................. 60-112236
Oct. 26, 1985 [JP] Japan .................................. 60-238596

[51] Int. Cl.$^4$ .............................................. G06K 9/62
[52] U.S. Cl. ...................................... 382/18; 382/34; 382/48
[58] Field of Search .................... 382/51, 18, 48, 34

[56] References Cited

U.S. PATENT DOCUMENTS

| | | | |
|---|---|---|---|
| 3,959,771 | 5/1976 | Uno et al. ............... | 382/18 |
| 4,013,999 | 3/1977 | Erwin et al. ............ | 382/48 |
| 4,218,673 | 8/1980 | Yoshida .................. | 382/18 |
| 4,251,799 | 2/1981 | Jih .......................... | 382/18 |
| 4,434,503 | 2/1984 | Tanaka et al. .......... | 382/48 |
| 4,490,851 | 12/1984 | Gerhart et al. ......... | 382/18 |
| 4,516,264 | 5/1985 | Corvari et al. ......... | 382/67 |
| 4,545,070 | 10/1985 | Miyagawa et al. ..... | 382/48 |
| 4,551,850 | 11/1985 | Werth et al. ........... | 382/18 |
| 4,566,126 | 1/1986 | Miyagawa et al. ..... | 382/48 |
| 4,570,181 | 2/1986 | Yamamura ............. | 382/48 |

Primary Examiner—Leo H. Boudreau
Attorney, Agent, or Firm—Brumbaugh, Graves, Donohue & Raymond

[57] ABSTRACT

Serial data processing equipment useful for product inspection in a factory automation system stores. Data concerning the number of picture elements above a threshold value which should be detected in each of sequentially divided visual fields or window areas of the product being inspected as viewed by a one-dimensional imaging element, or line scanner, is stored in memory. Data concerning the number of picture elements actually detected in each of the window areas is compared with the stored data and the comparison is stored in memory for use in deciding whether the product inspected is good or bad.

5 Claims, 19 Drawing Sheets

FIG. 1
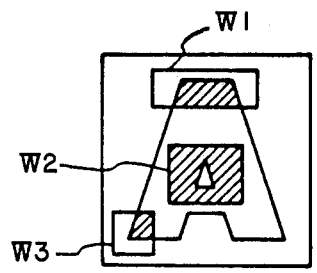
FIG. 2
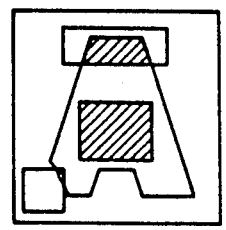
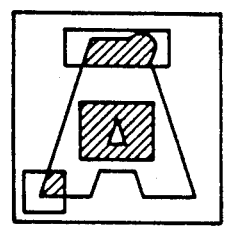
FIG. 3
FIG. 4   FIG. 5   FIG. 6
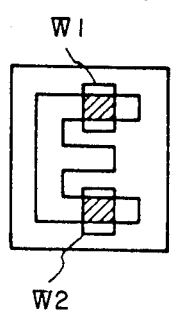 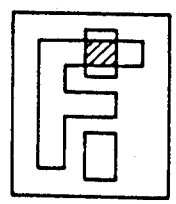 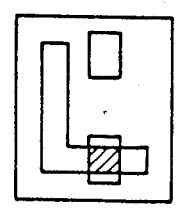

SERIAL DATA PROCESSING APPARATUS

BACKGROUND OF THE INVENTION

The present invention relates to a serial data processing apparatus, such as an image processing apparatus in which serial data of a video signal output from a one-dimensional imaging element is divided into any desired number of visual fields, and the results of counting the number of picture elements within each of the divided visual fields are the sequential output in real-time. More particularly, the present invention pertains to a serial data processing apparatus so designed that the data processing is facilitated.

PRIOR ART

There has recently been an increase in application of imaging devices, composed of a one-dimensional imaging element and a lens, to factory automation for the purpose, for example, of making decisions as to whether products are good or not, or of detecting a defect in products. As one of the techniques for inspecting products, a method has heretofore been adopted in which the entire visual field of a one-dimensional imaging element is divided into a plurality of visual fields, and the divided visual fields, which are described hereinafter as window areas, are set in a video signal, which represents the image of a product and which is obtained by the one-dimensional imaging element. Then, the number of significant picture elements corresponding to the product image within each of the window areas is counted, and the counted number of significant picture elements in each of the window areas is independently compared with a reference value, whereby even a product having a complicated configuration can readily be judged as to whether it is good or not on the basis of the result of the comparison, and the degree of accuracy in judgement and detection is also increased by such comparison.

It is possible, according to the above-described technique, to select any desired portion of a product from which a feature is to be extracted by changing the size, position and number of windows are desired. Therefore, this technique has a wide range of application and can flexibly cope with a change of the object to be inspected as well as enabling each portion of a picture to be judged independently. It is therefore possible to effect classification of different kinds of product, inspection of only a common portion, etc.

In addition, since the area is compared with a reference value, this method can be applied to an inspection line by appropriately determining the size of the windows without caring about any slight offset between a picture and an article about dust.

FIGS. 1-6 show examples of this window image processing.

FIGS. 1-3 show an example in which, in order to make an inspectin as to whether or not a character "A" is correctly printed, windows W1, W2 and W3 are set at three positions at which print errors particularly often occur. FIG. 1 shows an example in which the character "A" is printed correctly, while FIG. 2 shows an example in which the central portion of the character "A" is painted out, and the measured value for the area of the window W2 therefore exceeds a reference value. In addition, since the bottom left of the character "A" is missing, the measured value for the area of the window W3 is less than a reference value. For these reasons, the printed character is judged to be defective. In the example shown in FIG. 3, the measured values for the windows W2 and W3 are correct, but the measured value for the area of the window W1 exceeds a reference value since there is an excessively large drop of ink at the top right of the character "A"; therefore the printed character is judged to be defective.

FIGS. 4-6 show an example of sorting or identification of characters "E", "F" and "L" in which windows W1 and W2 are set. When both the measured values for the areas of the windows W1 and W2 exceed respective reference values, the character is judged to be "E"; when the measured value for the window W1 alone exceeds the reference value, the character is judged to be "F"; and when the measured value for the window W2 alone exceeds the reference value, the character is judged to "L".

When a microcomputer is employed for the division processing of video signal serial data, a data processing method has heretofore been adopted in which serial data constituted by binary video signals is converted to parallel data, e.g., 8-bit parallel data in the case of employing an 8-bit microcomputer, which are temporarily written into a memory by direct memory access (DMA), and then, the number of significant picture elements corresponding to each of the images within predetermined divided visual fields is counted by software in the microcomputer.

However, since the number of picture elements arranged in a one-dimensional imaging element has been increasing in recent years, there has been an increase in the number of visual fields which are to be divided into appropriate sizes, so that an excessively long period of time is required for data processing by the software. Accordingly, the conventional data processing method is no longer capable of effectively making an inspection or judgement of products moving on a conveying line even at ordinary transport speed, to say nothing of products being fed at relatively high speed.

It is an object of the present invention to enable a real-time and simple processing of serial data such as a video signal output from a one-dimensional imaging element for inspecting products moving on a conveying line.

SUMMARY OF THE INVENTION

To this end, according to the present invention, sequential data concerning the number of picture elements expected in each of the window areas to be scanned by a one-dimensional imaging element is written in a memory in advance and is sequentially read out from the memory in response to the input of video signal serial data which is being processed, so as to sequentially divide the input video signal serial data into portions for the respective window areas, and the number of significant picture elements corresponding to an image within each of the window areas is counted, and the result of counting is sequentially transferred to another memory by direct access as to be recorded therein.

Thus, it is possible, according to the present invention, to provide a serial data processing apparatus which can process serial data such as a video signal by dividing the data into any desired lengths in real-time manner so that it is possible to reduce the load on the software in the microcomputer and increase the speed of data processing, whereby the apparatus can satisfactorily cope with the need for an inspection of products moving on a conveying means at relatively high speed.

BRIEF DESCRIPTION OF THE DRAWINGS

FIGS. 1-6 respectively show examples of the window image processing.

FIGS. 18 to 24 are flowcharts showing programs, respectively, stored in the ROM, in which: FIG. 18 is a flowchart showing a main program; FIG. 19 is a flowchart showing a keyboard input processing; FIG. 20 is a flowchart showing an initial processing; FIG. 21 is a flowchart showing an interrupt processing INT1; FIG. 22 is a flowchart showing a measurement processing; FIG. 23 is a flowchart showing a judgement output processing; and FIG. 24 is a flowchart showing an interruption processing INT2.

EMBODIMENT OF THE INVENTION

Embodiments of the invention will be described hereinunder in detail with reference to the accompanying drawings.

Figure 7:
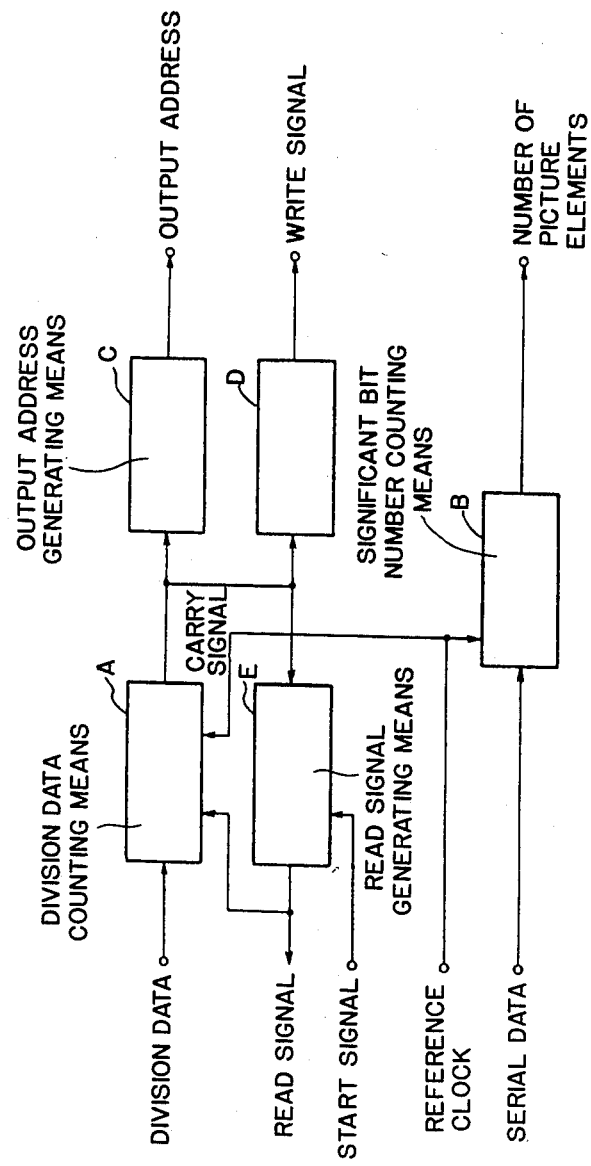
FIG. 7 is a block diagram showing a basic arrangement of the serial data processing apparatus according to the present invention.

FIG. 7 shows a basic arrangement of the serial data processing apparatus according to the present invention. In the illustrated basic arrangement, a read signal generating means E outputs a read command, i.e., illustrated as a read signal, to access an external memory, thereby reading out division data representing the number of picture elements for each of the window areas which divide the visual field of a one-dimensional imaging element, and presetting the read data in a division data counting means A. The division data counting means A generally counts down the division data in accordance with reference clocks corresponding to sequential picture elements and outputs a carry signal when the count reaches 0. The read signal generating means E outputs a read signal again in response to the output of this carry signal, thus presetting subsequent division data in the external memory.

It should be noted that, when division data is first preset in the external memory, a read signal is the output in response to a start signal. Further, in response to the above-described carry signal, an output address generating means C and a write signal generating means D, respectively, output a memory address and a write command, i.e., illustrated as output address and write signals, as will be describedlater, whereby the number of significant picture elements corresponding to an image in each of the window areas defined by sequentially dividing input serial data is recorded in an external memory or the like. In the illustrated arrangement, the divided picture element number data output from a significant bit number counting means B (described later) is the sum total of the number of significant picture elements corresponding to the image in the instant window area and the total of the numbers of significant picture elements corresponding to images in the window areas sequentially accumulated since the previous recording. However, it is possible to output only the number of significant picture elements corresponding to an image in each of the window areas by arranging the apparatus such that the significant bit number counting means B is cleared by the write signal.

Figure 8:
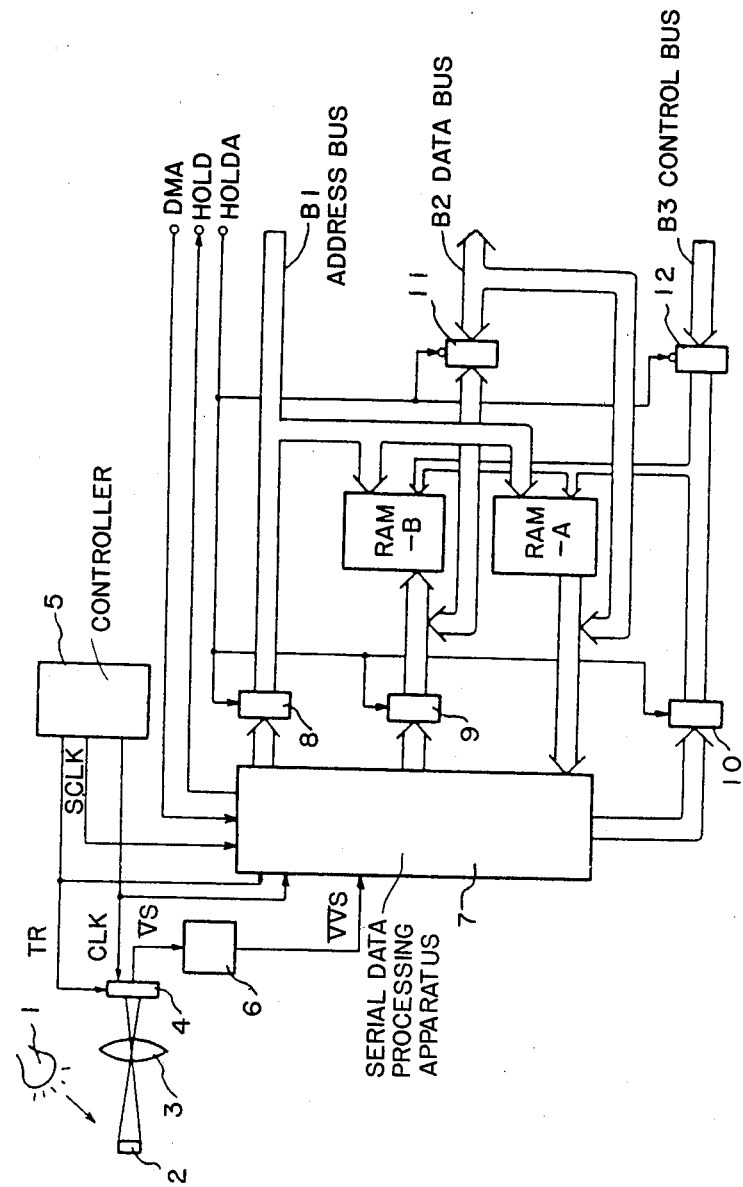
FIG. 8 is a block diatram showing an example of an arrangement in which the serial data processing apparatus according to the present invention is applied to inspection of products.

Referring next to FIG. 8, there is shown an arrangement of a practical example in which the serial data processing apparatus according to the first embodiment of the invention of this application is applied to inspection of products moving on a conveying means. In the illustrated arrangement, the image of a subject 2 which is illuminated by a light source 1 is focused on a one-dimensional image sensor 4 by means of a lens 3. The one-dimensional image sensor 4 is generally driven by a trigger signal TR which is supplied from an exclusive controller 5 so as to instruct the image sensor 4 to start one scanning and by reference clocks CLK which are also supplied from the controller 5. The one-dimensional image sensor 4 is generally composed of several hundreds to several thousands of photodiodes arranged in one line, each photodiode detecting a single 1-bit picture element. The respective outputs of the picture elements are taken out in the form of a pulse train in synchronism with the reference clocks CLK, thus forming a video signal VS. The video signal VS is supplied to an analog processing circuit 6 where it is amplified, wave-shaped and binary-coded, and the processed signal is the output in the form of a binary-coded video signal VVS constituted by serial data the bits of which are represented by either of two, high or low, values. The video signal VVS is supplied to the serial data processing apparatus 7 according to the present invention where it is subjected to the above-described dividing process to become data representing the number of significant picture elements corresponding to the image in each of the window areas. The reference symbol RAM-A denotes a random-access memory for writing division data representing the number of picture elements within each of the window areas which are formed by dividing the entire visual field of the one-dimensional image sensor. The symbol RAM-B denotes a random-access memory for writing the number of significant picture elements corresponding to the image within each of the window areas divided by the division data. Preset division data is written into the random-access memory RAM-A from a central processing unit CPU (not shown) for controlling the illustrated arrangement, through an address bus B1, a data bus B2 and a control bus B3. At this time, buffers 8, 9 and 10 are brought to a high-impedance state so as to be cut off, and the central processing unit CPU has the ability to access the random-access memories RAM-A and RAM-B. Thereafter, a direct memory access signal DMA is delivered to the serial data processing apparatus 7 from an input/output port of the central processing unit CPU. Then, the serial data processing apparatus 7 delivers a hold signal HOLD to the central processing unit CPU in response to the input of the trigger signal TR. In response to this hold signal HOLD, the central processing unit CPU delivers a response signal HOLD A which causes the buffers 8, 9, 10 to be activated and buffers 11, 12 to be brought into a high-impedance state. In consequence, the ability to access the random-access memories RAM-A and RAM-B is transferred to the serial data processing apparatus 7. Thereafter, reading of division data, counting of the number of significant picture elements within each of the window areas and writing of the result of counting into the random-access memory RAM-B are sequentially executed in real-time. When the processing of the video signal serial data for the entire visual field has been completed, the output of the hold signal HOLD is suspended. Accordingly, the ability to access the random-access memories RAM-A and RAM-B is returned to the central processing unit CPU.

As a result, it is possible for the central processing unit CPU to know the number of significant picture elements corresponding to the image within each of the window areas simply by reading out the contents stored at a predetermined memory address in the random-access memory RAM-B.

Figure 9:
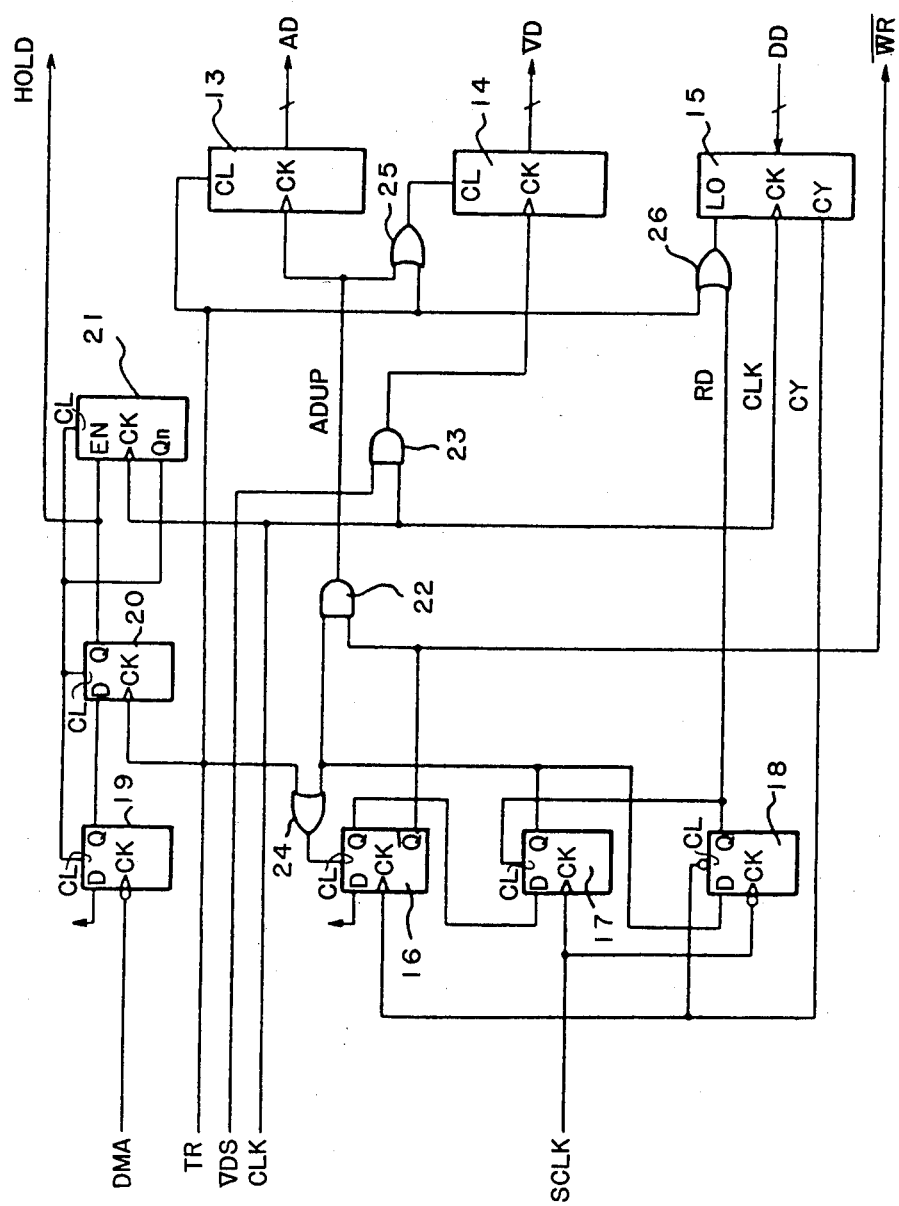
FIG. 9 is a block diagram showing an example of a typical arrangement of the serial data processing apparatus according to the present invention.

FIG. 9 shows a typical practical arrangement of serial data processing apparatus according to a first embodiment of the invention of this application.

In FIG. 9, the reference numeral 13 denotes an output address counter, 14 a picture element number counter, 15 a division data counter, 16 to 20 D-type flip-flops, 21 a visual field counter, 22, 23 AND gates, and 24 to 26 OR gates. The reference symbols AD denotes an output address, VD picture element number data, and DD division data.

In the illustrated arrangement, when direct memory access (DMA) request signal DMA is the output from the central processing unit CPU or other external device, a hold signal HOLD is the output in response to the input of a trigger signal TR which is first delivered, and thereafter, the ability to access each of the buses is transferred to the serial data processing apparatus 7.

The trigger signal TR clears the output address counter 13 which serves as the output address generating means C and the picture element number counter 14 serving as the significant bit number counting means B. Further, a first division data DD is written into the division data counter 15 serving as the division data counting means A in response to a rise of the reference clock signal CLK which begins after the input of the trigger signal TR. In the arrangement shown in FIG. 8, the division data DD is read out from the random-access memory RAM-A, and in this case, the output address AD is common to both random-access memories RAM-A and RAM-B. Therefore, the first division data DD is sequentially written into the address 0 in the random-access memory RAM-A.

Thus, after the rise of the trigger signal TR, the first division data DD is counted down for each reference clock CLK, and when the count reaches 0, a carry signal CY is the output.

In response to the input of this carry signal CY, a write signal WR is the first output from the flip-flop 16, and the data representing the number of significant picture elements which is available when the carry signal CY is generated is written at the address 0 within the random-access memory RAM-B in the arrangement shown in FIG. 8. The picture element number counter 14 counts the number of reference clocks CLK which are input thereto when bits of the video signal serial data VVS are at the high level.

In response to a rise of a subsidiary clock signal SCLK (described later) which is the first after the output of the write signal, an address up signal ADUP is output, and the output address AD is thereby counted up by 1.

It should be noted that, in this embodiment, the reference clock signal CLK has a duty cycle of ¼, while the subsidiary clock signal SCLK has the same period and duty cycle as those of the reference clock signal CLK and is 180° out of phase with the reference clock signal CLK, and both the clock signals are obtained from the controller 5.

The address up signal ADUP, at the same time, clears the picture element number counter so as to prepare for the counting of the number of significant picture elements in a subsequent window areas. In response to a rise of the subsidiary clock signal SCLK which is the first after the output of the address up signal ADUP, a read signal RD is the output from the flip-flop 18 serving as the read signal generating means E, and a second division data DD is thereby read out from the address 1 within the random-access memory RAM-A in the arrangement shown in FIG. 8 and newly preset in the division data counter 15. Data processing similar to the above is then repeated.

It should be noted that the entire visual field of the one-dimensional image sensor 4 is set in the visual field counter 21, and when the reference clocks CLK are counted for the entire visual field, the hold signal HOLD is cleared.

Figure 10:
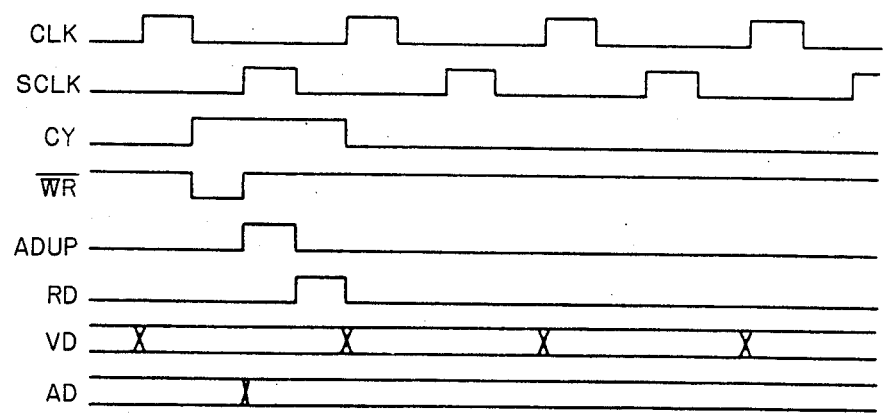
FIG. 10 is a timing diagram showing an example of a serial data processing according to the present invention.

FIG. 10 is one example of a timing diagram showing the above-described serial data processing according to the present invention. In the illustrated diagram, each data processing is completed during one period of the reference clock signal CLK. After the output of the carry signal CY, the picture element number data VD is written into the external memory in response to a rise of the wire signal WR, and the output address data AD is counted up in response to a rise of the address up signal ADUP. The AND gate 22 in the example (shown in FIG. 9) of the apparatus according to the present invention is disposed so that the address up signal ADUP is the output after the rise of the write signal WR.

Figure 11:
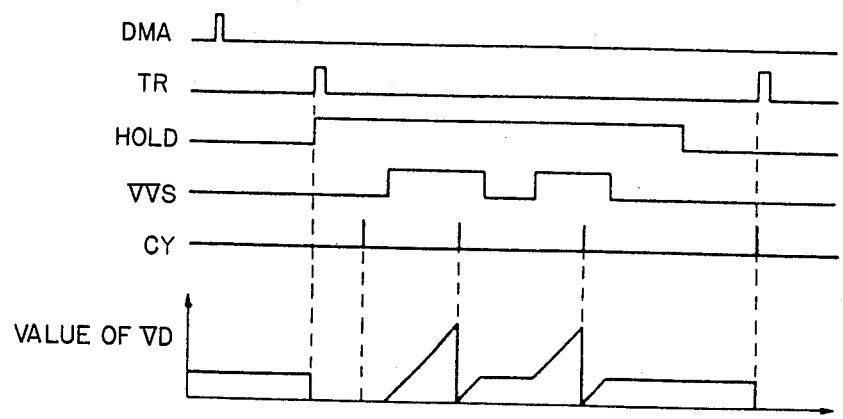
FIG. 11 is a timing diagram showing an example of the whole process of the serial data processing according to the present invention.

Referring next to FIG. 11, there is shown an example of a timing diagram for the data processing in the typical arrangement shown in FIG. 8 of the apparatus according to the present invention and its application illustrated in FIG. 9. When the direct memory access signal DMA is input to the serial data processing apparatus 7 of the present invention from the microcomputer through the input/output port and the like, a hold signal HOLD is output subsequently to a trigger signal TR which is first input after the direct memory access signal DMA has been input.

For example, when the video signal serial data VVS has a waveform such as that illustrated in FIG. 11, and the carry signal CY is output as shown in FIG. 11 in accordance with the division data, the significant picture element number data VD which is the output of the picture element number counter 15 changes as illustrated in FIG. 11.

The following is a description of a practical arrangement in which the present invention is applied to a decision system for a conveying means such as a conveyor.

Figure 12:
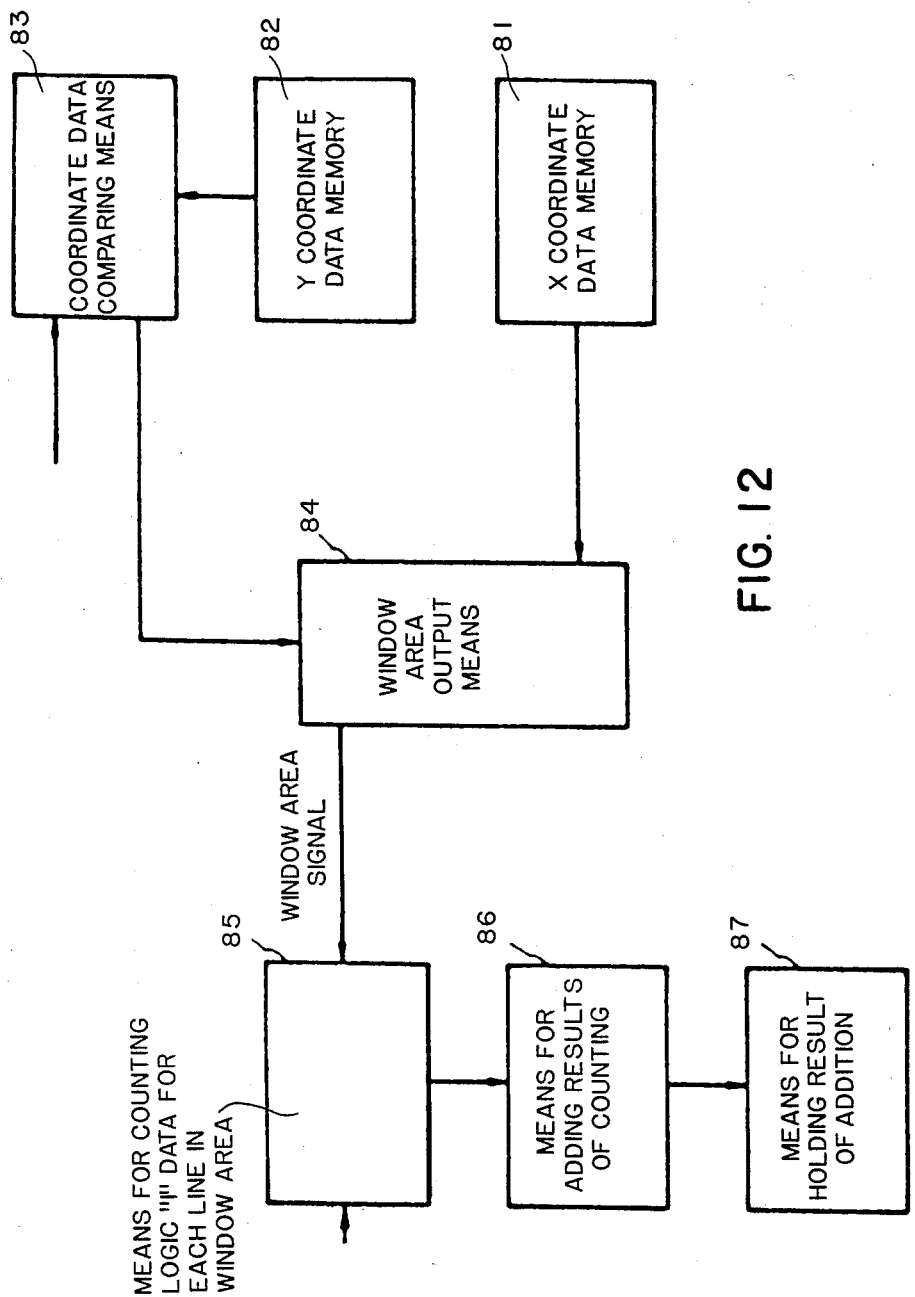
FIG. 12 is a block diagram showing a basic arrangement of the serial data processing apparatus according to the present invention.
Figure 13:
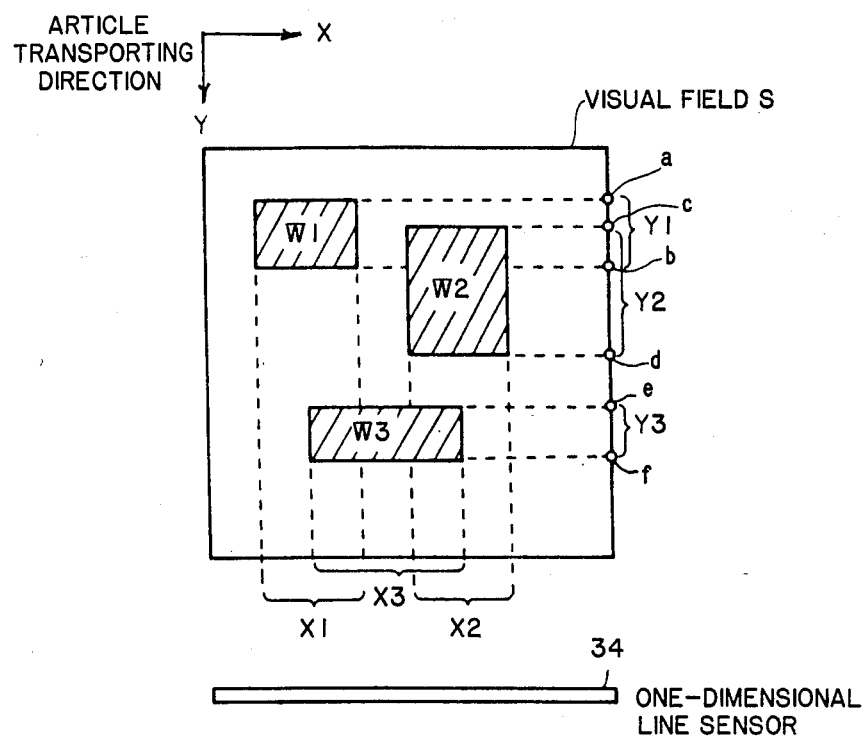
FIG. 13 shows coordinates of window areas within a visual field.

FIG. 12 is a block diagram showing a basic arrangement of a serial data processing apparatus according to a second embodiment of the present application, and FIG. 13 is a view showing coordinates of window areas within a visual field.

The arrangement shown in FIG. 13 will be explained first for convenience. It is assumed that three windows W1, W2 and W3 are set as illustrated in a visual field S through which it is possible to view an article being transported along a conveying line. In consequence, coordinate data are given by the respective Y-coordinate sections Y1 (the section between (a) and (b)), Y2 (the section between (c) and (d)) and Y3 (the section between (e) and (f)) of the windows W1 to W3 in the direction of Y which is parallel to a direction in which the article is transporated, and X-coordinate sections X1, X2 and X3 in the direction of X which is parallel to a direction in which a one-dimensional line sensor 34 effects scanning.

Referring next to FIG. 12, an X-coordinate data memory 81 stores the X-coordinate data of X1, X2 and X3 respectively concerning the windows W1 to W3. A Y-coordinate data memory 82 stores the Y-coordinate data of Y1, Y2 and Y3 respectively concerning the windows W1 to W3.

A coordinate data comparing means 83 is supplied as an input with a pulse train which is generated by a means (not shown) and which represents the transporting speed of the article conveying line, and counts the number of input pulses to obtain the relative distance between an article being transported, (which corresponds to the visual field S) and the one-dimensional line sensor 34, that is, the Y-coordinate of the sensor 34 obtained when it is considered that the article, is at rest, while the line sensor 34 moves in the direction of Y. The means 83 makes comparison between the obtained distance and the Y-coordinate data concerning each window output from the memory 82, generates an output when the two values coincide with each other, and delivers the output to a window area output means 84.

The window area output means 84 is supplied as inputs with the output from the coordinate comparing means 83 and the X-coordinate data from the memory 81. The means 84 outputs the AND of the two input data and delivers it to a counting means 85. For example, the means 84 delivers the AND of Y1 coordinate data from the comparing means 83 and X1 coordinate data from the memory 81 as a window area W1 signal. Similarly, the means 84 delivers the AND of Y2 coordinate data and X2 coordinate data as a window area W2 signal and the AND of Y3 coordinate data and X3 coordinate data as a window area W3 signal.

The counting means 85 examines the serial scanning data output from the one-dimensional line sensor 34 only when a window area signal is being input thereto, that is, the means 85 examines the serial data obtained by each of the scanning operations carried out within a particular window area, e.g., the window W1. The means 85 detects significant picture element data (e.g., a logic "1") and counts the number of bits of such data, the result of counting being delivered to an adding means 86.

The adding means 86 adds together the results of counting of the number of significant picture element data included in the data obtained by each of the scanning operations carried out within each of the window areas so as to obtain a total of significant picture element data for each window area, and delivers the obtained value to a holding means 87 so as to be held therein.

In this case, since the window areas W1, W2 and W3 are set so that they do not overlap each other, the total of significant picture element data obtained for each window area is held in the holding means 87. Accordingly, it is possible to make comparison between the total of significant picture elements for each window area and a reference value for each window which is prepared separately and to decide whether the article is good or not on the basis of the result of the comparison.

The basic arrangement and operation principle of the serial data processing apparatus according to a second embodiment of present invention are as described above.

Typical applications of the present invention will be explained below with reference to the accompanying drawings.

Figure 14:
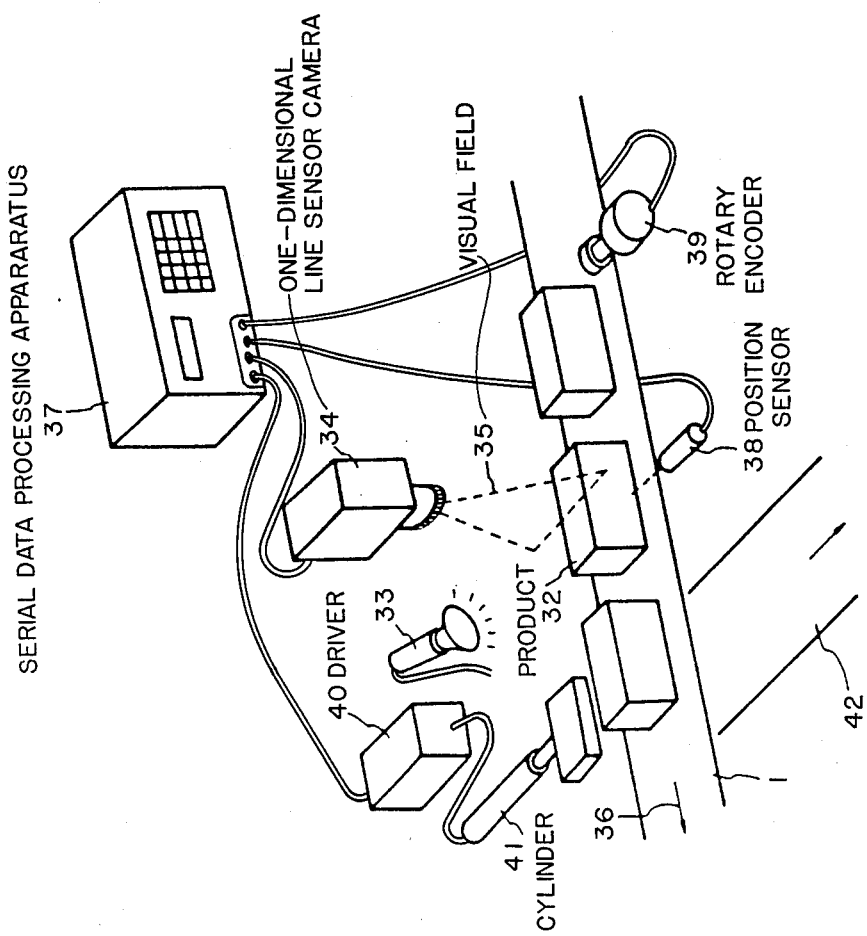
FIG. 14 is a perspective view showing an arrangement in which one embodiment of the present invention is applied to an inspection of products.

FIG. 14 is a perspective view of an example of a particular application of the present invention in which the serial data processing apparatus according to the present invention is applied to inspection of products.

Referring to FIG. 14, each of the products 32 transported by a conveyor belt 31 is illuminated by a light source 33. A one-dimensional line sensor camera 34 is disposed so that the visual field 35 thereof extends perpendicularly to a direction 36 of travel of the belt conveyor 31. The one-dimensional picture of the product 32 is delivered in the form of serial data to a serial data processing apparatus 37 according to the present invention.

A position sensor 38 for detecting a product 32 turns ON while the product 32 is passing the position of the visual field 35, and delivers an ON-OFF signal to the serial data processing apparatus 37. A rotary encoder 39 delivers a pulse train having a pulse duration or width which is inversely proportional to the speed of travel of the belt conveyor 31 to the serial data processing apparatus 37. The serial data processing apparatus 37 can know the coordinate of the product 32 in the belt conveyor travling direction 36 by counting the number of pulses output from the rotary encoder 39. Thus, the serial data processing apparatus 37 knows the period of time during which a predetermined window area on the product 32 is passing through the visual field 35 of the one-dimensional sensor camera 34, and counts as well as adds the numbers of significant bits (e.g., picture element signals representing the logic "1") in the binary-coded output delivered from the camera 34 during this period, whereby it is possible to measure an amount which is proportional to the area of a predetermined window area on the product 32.

After the passage of the product 32, the serial data processing apparatus 37 judges the quality of the product 32 by making comparison between the result of measurement for a predetermined window area and a reference value. When the product 32 is judged to be bad, the serial data processing apparatus 37 delivers a signal to an air cylinder driver 40 so as to move an air cylinder 41, thereby pushing out the defective product toward a defective-product conveyor 42.

Figure 15:
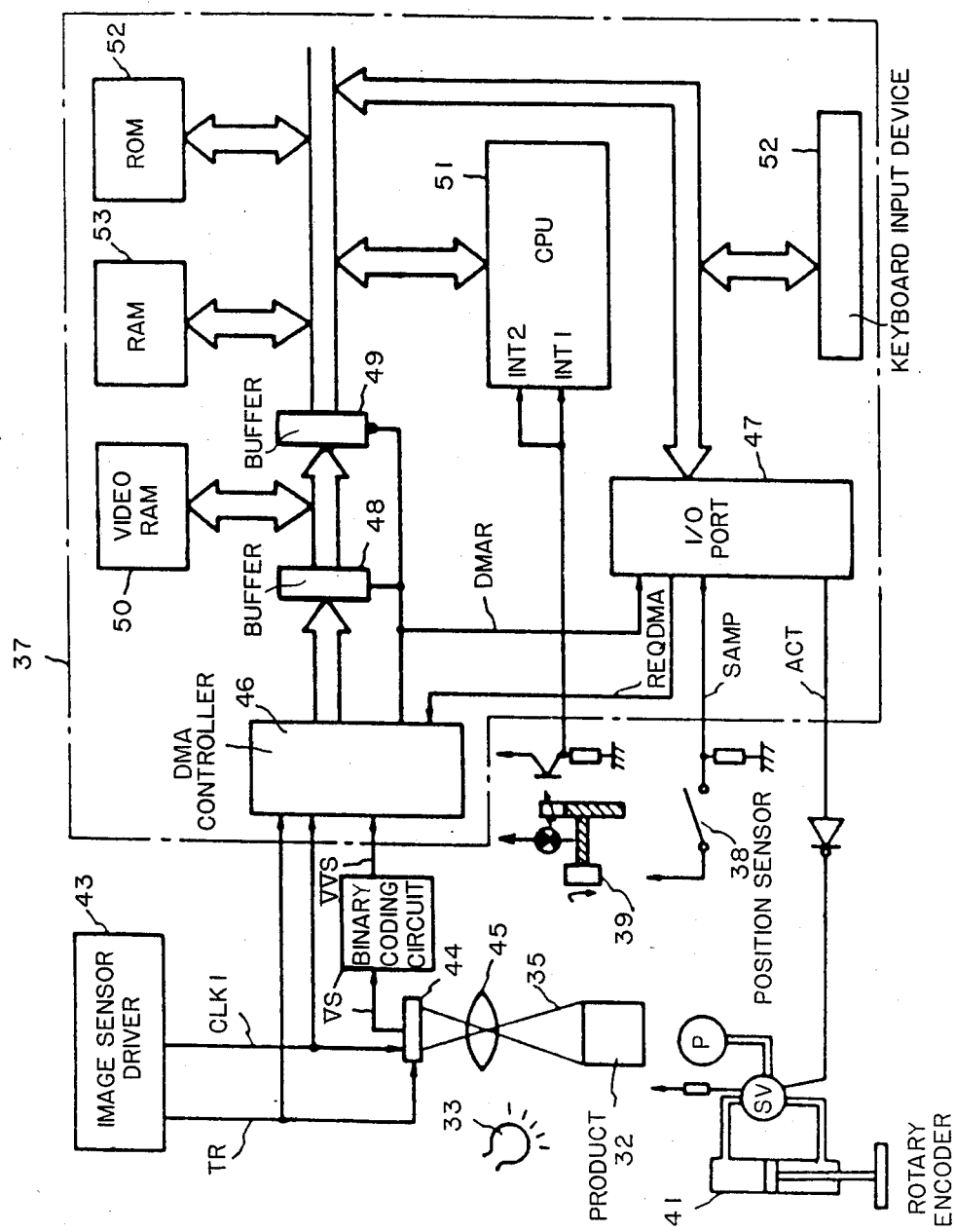
FIG. 15 is a block diagram showing a hardware arrangement of an embodiment of the present invention.

FIG. 15 is a block diagram of an example of the hardware arrangement of the serial data processing apparatus 37 in accordance with another embodiment of the present invention.

Referring to FIG. 15, an image sensor driver 43 delivers a trigger signal TR representing the start of scanning and a transfer clock CLK1 to a one-dimensional line image sensor 44, and outputs an analog video signal VS representing the image of a product 32 which is formed on the image sensor 44 by means of a lens 45. The analog video signal VVS is binary-coded by a threshold voltage having a predetermined level and inputted as a binary-coded video signal VS to the serial data processing apparatus 37.

A DMA (direct memory access) controller 46 outputs a DMA response signal DAE in response to a DMA request signal REQDMA output from an i/o port 47, thereby switching buffers 48 and 49 so as to change over the bus to the DMA controller 46 and thus DMA transferring the binary-coded video signal VVS to a VIDEO-RAM 50.

The output signal (pulses) from the rotary encoder 39 is input to interrupt terminals INT1 and INT2 of a CPU 51, and the number of pulses from the encoder 39 is counted by interrupt processing. The CPU 51 can read an ON-OFF signal (a SAMP signal representing whether or not a product 32 has arrived) from the position sensor 38 through the i/o port 47. On the basis of the ON-OFF signal, the CPU 51 delivers its output as an ACT signal through the i/o port 47, thereby allowing the air cylinder 41 to be driven.

In addition, the CPU 51 can be supplied as inputs with necessary data (e.g., coordinate data concerning a set window area) from a keyboard input device 52 and executes processing using a general-purpose RAM 53 and a memory in accordance with a program written in a ROM 52.

Figure 16:
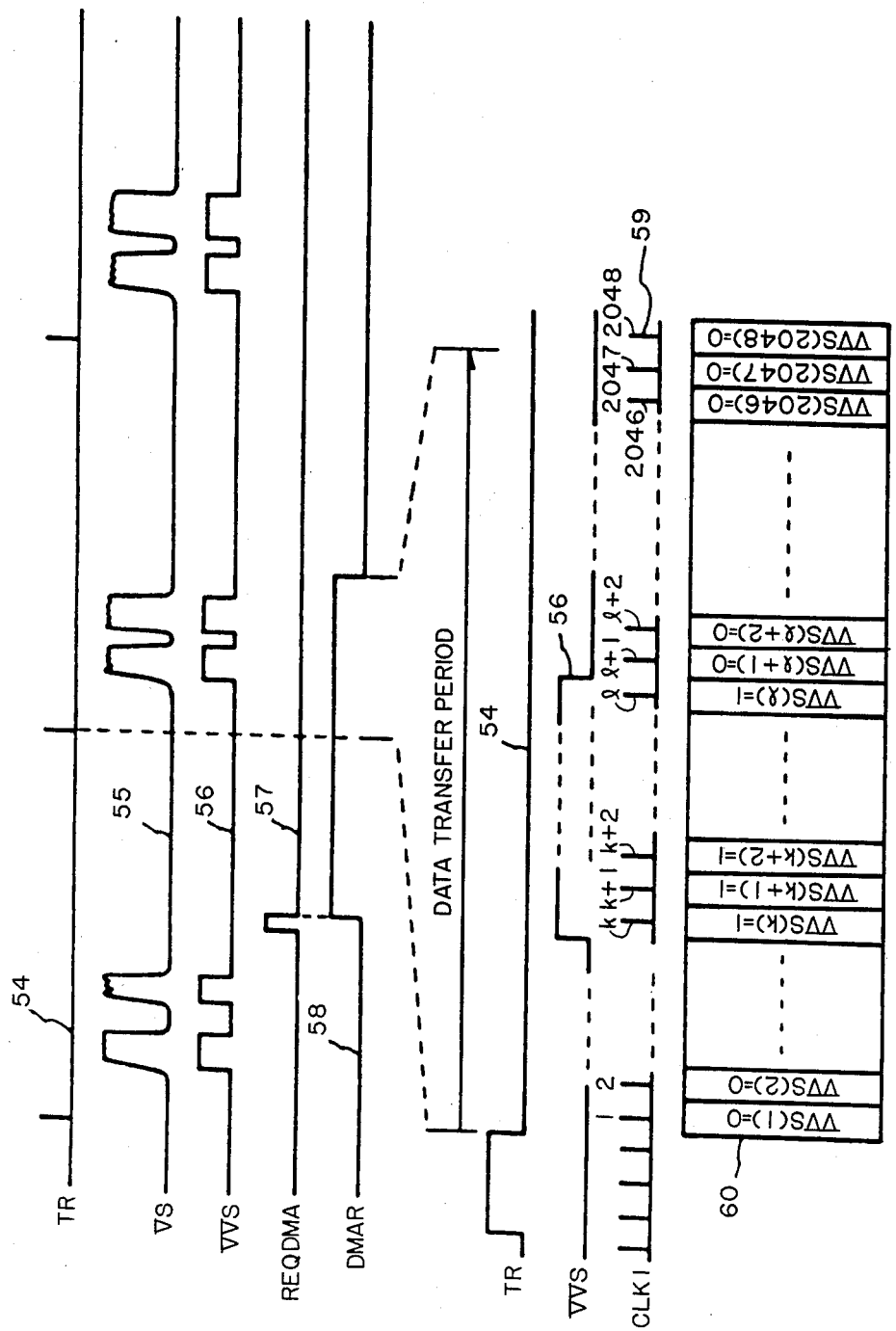
FIG. 16 is a timing diagram of signals at essential portions in the arrangement shown in FIG. 15.

FIG. 16 is a timing diagram showing the respective states of signals at particular positions in the arrangement illustrated in FIG. 15. The operation of the arrangement shown in FIG. 15 will be explained below with reference to FIGS. 15 and 16 in combination.

The one-dimensional line image sensor 44 outputs an analog video signal 55 (VS) representing the data concerning all the picture elements for an entire line, a total of 2,048 picture elements, in response to a trigger signal 54 which serves as a start signal TR, and a binary-coded video signal 56 (VVS) is inputted to the DMA controller 46. When the binary-coded video data VVS is required, the CPU 51 outputs a DMA request pulse 57 (REQDMA) through the i/o port 47, and a DMA response signal 58 (DMAR) is the output at the timing at which the DMA request pulse 57 falls. Thus, transfer of data concerning the 2,048 picture elements for one line is started.

The binary-coded video signal 56 (VVS) is DMA transferred to the VIDEO-RAM 50 in accordance with the transfer clocks 59 (CLKI) where the level of each bit of the video signal 56 (VVS) is judged to be high or low at the timing at which each clock 59 (CLKI) is generated, and in accordance with the decision, data is stored in a video memory 60 (not shown in FIG. 15) incorporated in the VIDEO-RAM 50, as shown in FIG. 16.

Figure 17:
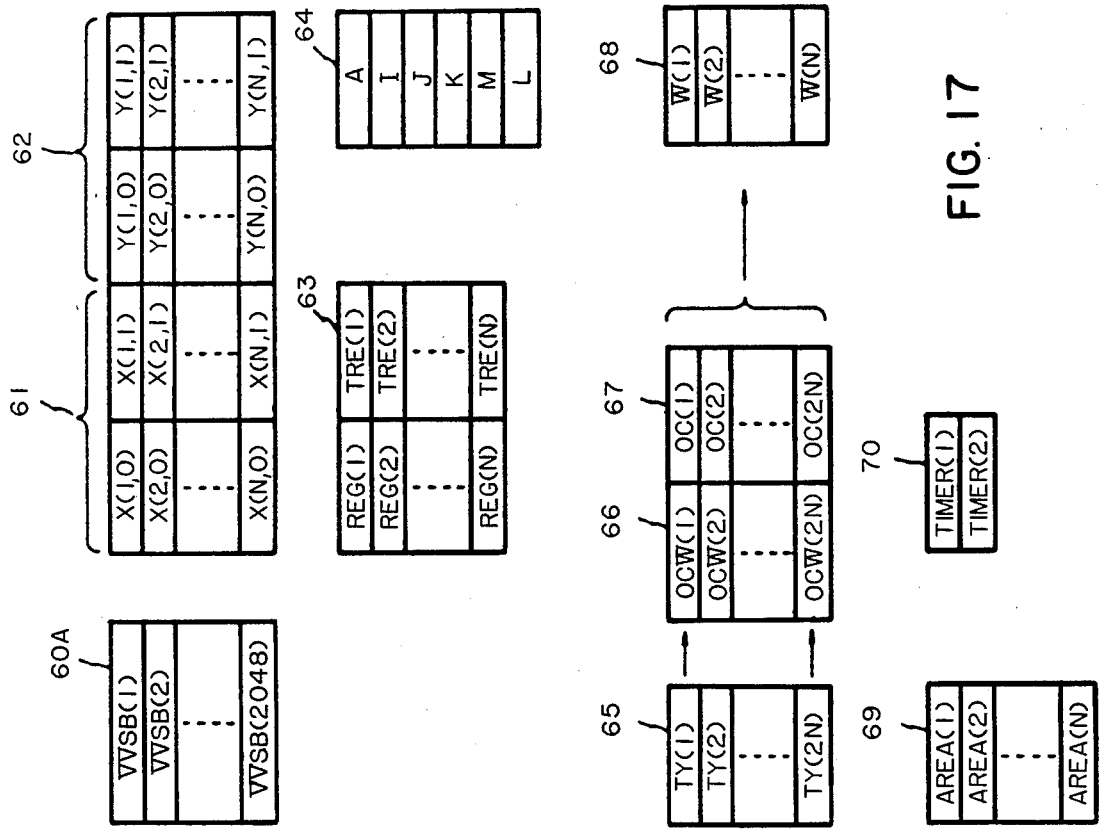
FIG. 17 shows a practical example of the memory configuration in the embodiment of the present invention shown in FIG. 15.

FIG. 17 shows a practical example of a memory organization in the embodiment of the present invention illustrated in FIG. 15. Each of the memory areas shown in FIG. 17 is included in the RAM 53 in the arrangement shown in FIG. 15.

A serial data buffer 60A provides an area for reading the DMA transferred serial data from the VIDEO-RAM 50 and buffering the read serial data in the RAM 53. A window X-coordinate storing area 61 is adapted to store the respective coordinates of the starting and terminating points of each window in a coordinate system in which the direction of X is defined by the direction of scanning by the one-dimensional line sensor 44, the coordinates being represented by the corresponding serial numbers of the picture elements included in one line scanned by the one dimensional line sensor 44. In accordance with the X-coordinate data, data included in a particular window area is extracted from the input serial data, and the number of significant picture elements (e.g., picture elements representing the logic "1") in the extracted data is counted.

The representation of X(N, 0) in the window X-coordinate data storing area 61 means an area for storing the X-coordinate (a coordinate closer to the LSB side in the arrangement of picture elements in one line scanned by the line sensor 44) of the starting point of the Nth window (a point at which the Nth window opens), and X(N, 1) means an area for storing the X-coordinate (a coordinate closer to the MSB side in the arrangement of picture elements in one line scanned by the line sensor 44) of the terminating point of the Nth window (a point at which the Nth window is closed).

A window Y-coordinate data storing area 62 is an area for storing Y-coordinate data concerning each of the windows which is represented by the number of pulses output from the rotary encoder 39. The representation of Y(N, 0) in the area 62 means an area for storing the Y-coordinate of the starting point of the Nth window (at a point at which the Nth window opens), and Y(N, 1) means an area for storing the Y-coordinate of the terminating point of the Nth window (a point at which the Nth window is closed).

A decision data storing area 63 is an area for storing reference value data employed to make comparison of the result of measurement performed on a judged window. REG(N) and TRE(N) in the area 63 are data used to mean that, when the result of measurement carried out on the Nth window falls in the following range:

REG(N)±TRE(N)

then, the Nth window is judged to be good, whereas, when the measurement result is out of this range, the Nth window is judged to be defective. In other words, REG(N) is data which represents a reference value for the Nth window, and TRE(N) is data which represents a permissible error.

A work area 64 consists of work regions from A to L which are used when the CPU executes processing operations, and the affixes (identification symbols) A to L are employed when the same operation is repeated.

A Y-coordinate rearranged data storing area 65 is an area for storing the Y-coordinate data stored in the window Y-coordinate data storing area 62 by rearranging them by size irrespective of the window numbers. Although, in FIG. 13, the Y-coordinate of the starting point of the window W1 is (a), and the Y-coordinate of the terminating point is (b); the Y-coordinate of the starting point of the window W2 is (c), and the Y-coordinate of the terminating point is (d); and the Y-coordinate of the starting point of the window W3 is e, and the Y-coordinate of the terminating point is (f), in the area 65 the Y-coordinate data are rearranged by size, i.e., in the following sequence: (a), (c), (b), (d), (e) and (f), that is, TY(1), TY(2), TY(3), When the count of pulses output from the rotary encoder 39 reaches TY(1), that is, (a) in FIG. 13, this means that the window W1 opens at this timing. Then, when the count of pulses output from the rotary encoder 39 reaches TY(2), that is, (c) in FIG. 13, this means that the window W2 opens at this timing. Similarly, when the count of pulses output from the rotary encoder 39 reaches TY(3), this means that the window W1 is closed at this timing. Thereafter, the timing at which each of the subsequent windows opens or closed is sequentially acknowledged in a manner similar to the above.

Therefore, the region OCW(1) in an open/close numerical data storing area 66 stores the window number corresponding to TY(1) in the area 65, i.e., W1 in this case, and the region OC(1) in an open/close data storing area 67 stores data representing the fact that the window with the window number W1 is open or closed, i.e., data representing the fact that the window W1 is open in this example.

A window work area 68 stores data representing the present state of each of the windows, i.e., the fact that each of the windows is open or closed at the present time, the data being momentarily corrected by the data stored in the open/close data storing area 67.

An addition work area 69 consists of N areas. When the CPU 51 looks at the window work area 68 and knows that, for example, the window W is open, the CPU 51 then looks at the window X-coordinate data storing area 61 and knows the X-coordinate data of the window W1. Using this X-coordinate data, the CPU 51 detects significant picture elements for each scanning included in the window area W1 from the serial output data and counts the number of detected significant picture elements, the result of counting being added to, e.g., AREA(1) in the work area 69.

Next, a timer area consists of counting areas TIMER(1) and TIMER(2), the former being an area for counting the number of pulses output from the rotary encoder 39, and the latter being an area for counting the number of clocks CLK1 for driving the one-dimensional line image sensor 44.

The program incorporated in the ROM 52 in the arrangement shown in FIG. 15 will next be explained with reference to flowcharts respectively shown in FIGS. 18 to 24.

Figure 18:
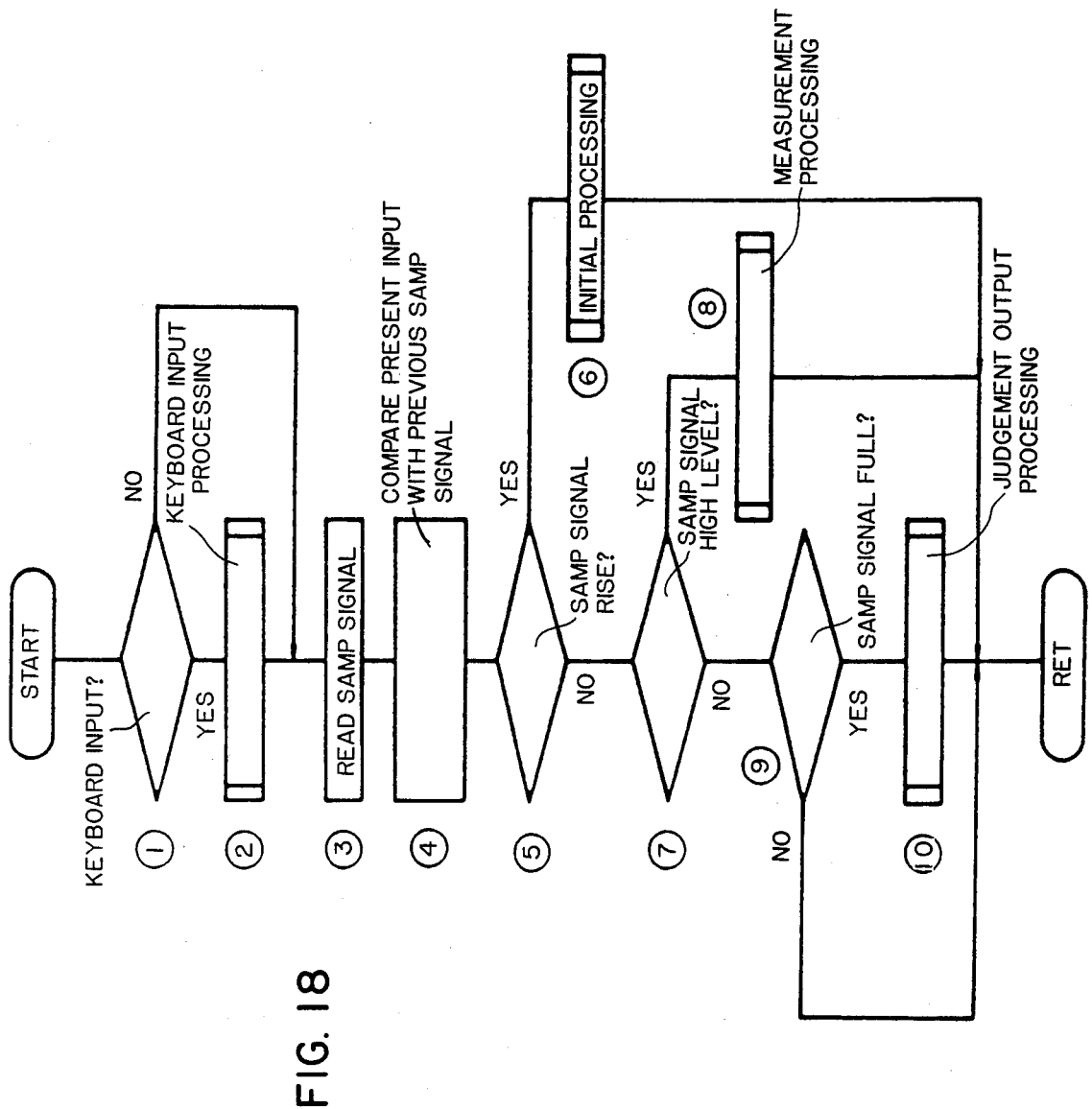

FIG. 18 shows a main program, and this routine is generally repeated by the CPU 51.

Judgement is made in Step (1) as to whether or not any input from the keyboard input device 52 is available. If YES, the process proceeds to Step (2) where the input from the keyboard input device 52 is read in accordance with a keyboard input processing routine as a subroutine. Thereafter, the process proceeds to Step (3). If NO is the answer in Step (1), the process jumps to Step (3) where the output signal SAMP from the position sensor 38 is read and compared with the previous SAMP signal (Step 4).

Then, judgement is made as to whether or not the previous SAMP signal is low in level and the present SAMP signal is high in level. If YES, it is judged that the SAMP signal has risen. It is consequently judged that a product 32 has just entered the visual field 35, and the process then proceeds to Step (6) where an initial processing subroutine for effecting initial setting required for the window measurement carried out thereafter is executed. If NO is the answer in Step (5), the process proceeds to Step (7) where judgement is made as to whether or not the SAMP signal read at the present time is high in level.

If YES is the answer in Step (7), that is, if the present SAMP signal is high in level, this means that the product which is to be measured is within the visual field 35, and the process then proceeds to Step (8) where measurement processing as a subroutine is executed. If the present SAMP signal is low in level, the process proceeds to Step (9) where judgement is made as to whether or not the previous SAMP signal is high in level. If YES, it is judged that the product 32 has just passed the visual field 35, and the process then proceeds to Step (10) where judgement processing as a subroutine is executed in which the product 32 is judged to be good or not by making comparison between the result of measurement stored in the addition work area 69 and the data stored in the judgement data storing area 63.

If NO is the answer in Step (9), this means that the product 32 is completely offset from the visual field 35, and the process then proceeds to RET (return). After RET, other processings (omitted because these operations are not related to the gist of the present invention) are executed, and the process then returns to START. Thereafter, Steps (1) to (10) are repeated.

Figure 19:
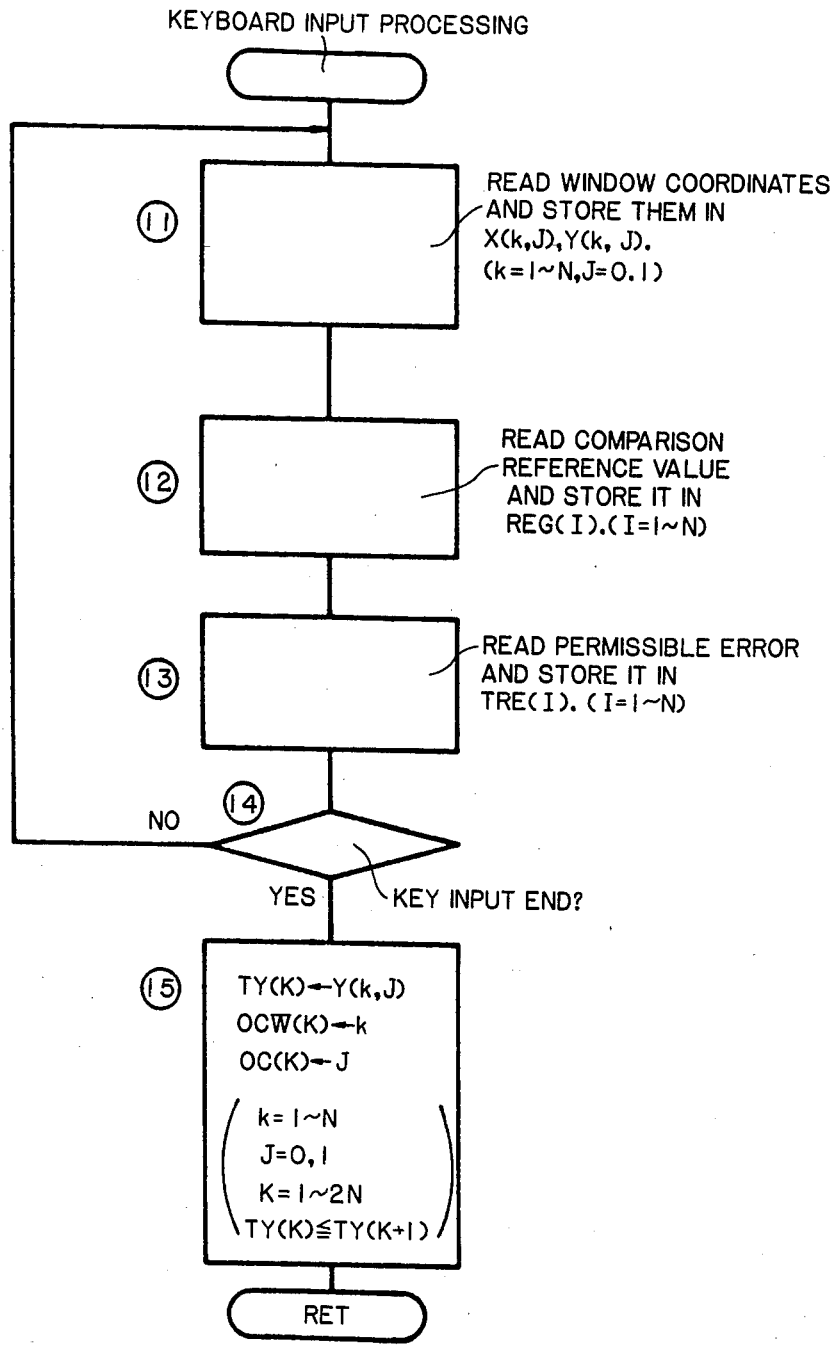

FIG. 19 shows the flowchart of the above-described keyboard input processing as a subroutine.

In Step (11), the coordinates of the window with the number k are read in the respective areas X(k, J) and Y(k, J) in the coordinate storing areas 61 and 62 (where k=1, 2 ... N, and J=0, 1). The contents of each data are as described above with reference to FIG. 17.

A comparison reference value and a permissible error which are to be stored in the judgment data storing area 63 are respectively read in Steps (12) and (13), and the process then proceeds to Step (14) where judgement is made as to whether or not the key input has been completed and all the necessary data has already been input. If NO, the process returns to Step (11), and the processing of Steps (11)→(12)→(13) is repeated. If all the necessary data has already been input, the process proceeds to Step (15).

In Step (15), all the values for Y(k, J) are examined, that is, for k=1, 2 ... N, and J=0, 1 and values for K, i.e., 1 to 2N, are allotted to Y(k, J) in the order of increasing number. Further, Y(k, J) is stored in TY(K) in the Y-coordinate rearranged data storing area 65, while the value for k is stored in OCW(K) in the open/close numerical data storing area 66, and the value for J is stored in OC(K) in the open/close data storing area 67. Accordingly, the relationship of TY(K)≦TY(K+1) is established.

The number of pulses output from the rotary encoder 39 is counted through the interruption input terminal INT1 of the CPU 51, and when the count reaches TY(k), if OC(k) is 0, it may be judged that the window with the window number OCW(k) is closed, that is, the visual field 35 is at the terminating point of the window, whereas, if OC(k) is 1, it may be judged that the window is open, that is, the visual field 35 is at the starting point of the window.

Figure 20:
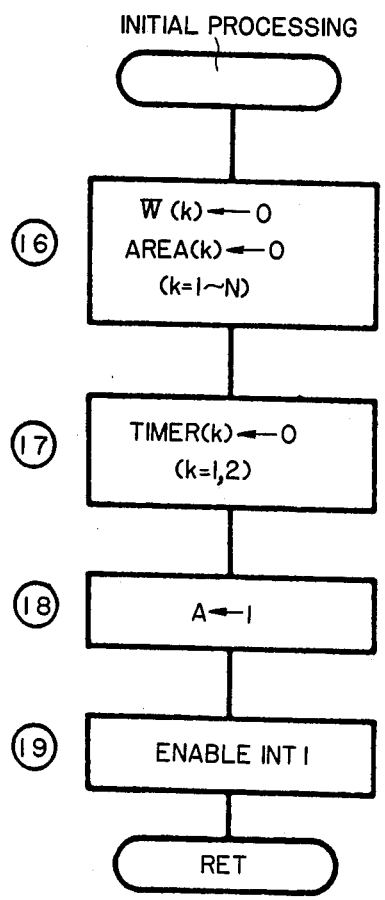

FIG. 20 shows the flowchart of the initial processing as a subroutine. The initial processing effects initial setting carried out immediately before measurement is conducted. Since, in this state, all the windows are closed, 0 which represents that all the windows W(k) (where k=1 to N) are closed is substituted into the window work area 68. In addition, 0 is also substituted as an initial value into AREA(k) in the addition work area 69 which represents the measured area of the window W(k).

In Step (17), TIMER(1) and TIMER(2) in the timer area 70 are preset, and 0 is set therein. In Step (18), 1 is substituted for the affix A in the work area 64 which designates the value for (k) of TY(k) in the storing area 65.

In Step (19), the interrupt input INT1 is enabled in order to count the number of input pulses from the rotary encoder 39.

Figure 21:
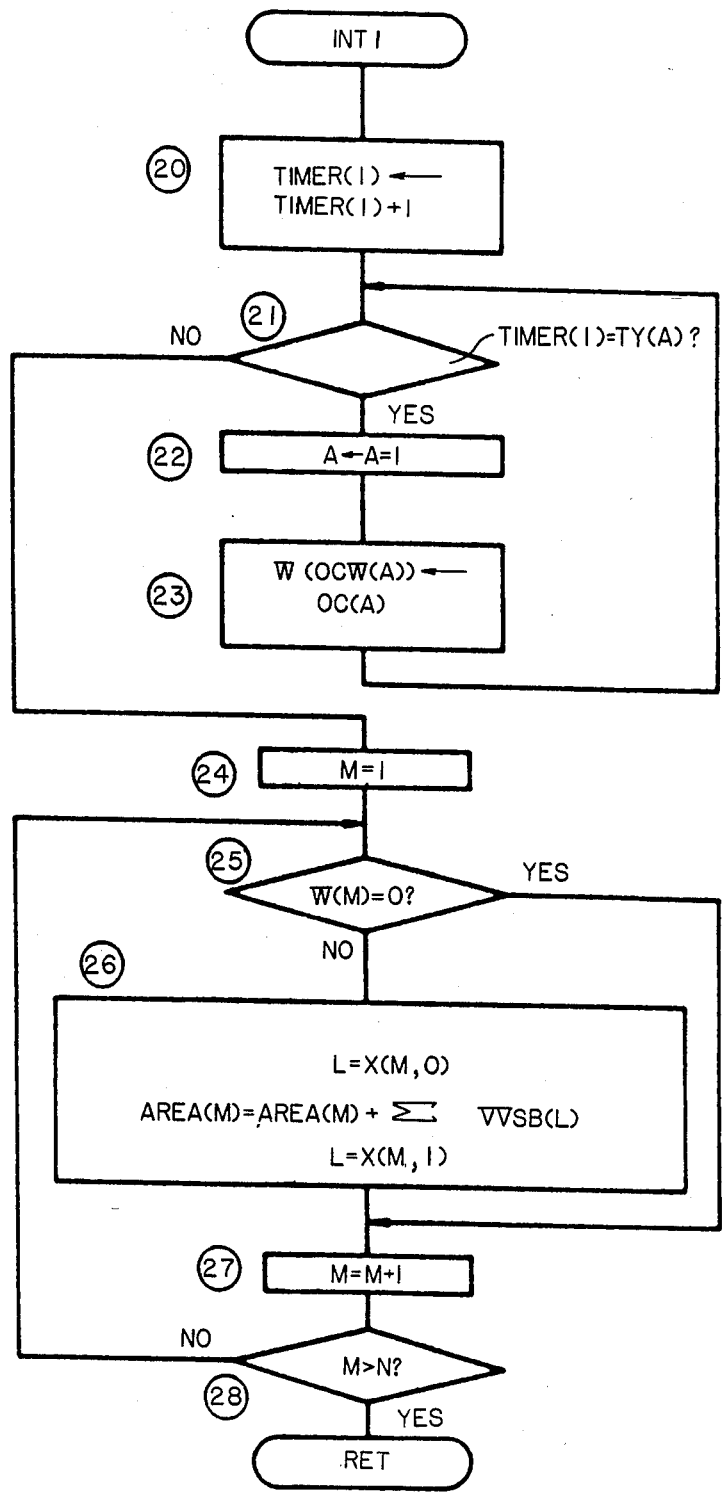

FIG. 21 shows the interrupt processing routine INT1. In this routine, processing of INT1 Steps (20) . . . (28)→RET is executed once every time one pulse output from the rotary encoder 39 is input to the terminal INT1. TIMER (1) is counted up by 1 in Step (20). Judgement is made in Step (21) as to whether or not TIMER(1) becomes equal to TY(A). A of TY(A) is first set at 1 in the initial processing as a subroutine (see FIG. 20).

If TIMER(1)=TY(A), the process then proceeds to Step (22) where A is counted up by 1, and the process proceeds to Step (23) where data OC(A) which represents that the window is open or closed is substituted into the window W{OCW(A)}. This is a processing for setting WA{OCW(A)} in the window work area 68 which represents the following facts: when the count of pulses output from the rotary encoder 39 becomes equal to any one of the data in the Y-coordinate data storing area 62, W{OCW(A)} represents a window with the number {OCW(A)} which is related to said Y-coordinate data; if the data OC(A) is 0, this means the visual field 35 is at the terminating point of the window; if the data OC(A) is 1, this means that the visual field 35 is at the starting point of the window; and W{OCW(A)} shows which windows are open and which windows are closed at the present time.

Thereafter, the process returns to Step (21) where judgement is made as to whether or not TIMER(1)-=TY(A). The value for A at this time has already been incremented in Step (22) so as to be 1 larger than that in the previous judgement made in Step (21). The repetition of Steps (21), (22) and (23) is carried out because there may be data items which are equal to each other in the Y-coordinate data storing area 62. Upon the completion of processing all possible data items which are equal to each other, the answer in Step (21) becomes NO, and the process then proceeds to Step (24).

In Step (24), the affix M is set at an initial value 1 in order to repeat the processing of Steps (25)→(26)→(27)→(28) N times. Judgement is made in Step (25) as to whether or not W(M)=0. W(M) takes either 0 or 1. When W(M)=1, this means that the window M is open, and the answer of the judgement at that time is NO. Therefore, Step (26) is executed. When W(M)=0, the process jumps to Step (27) where M is incremented by 1, and judgement is made in Step (28) as to whether or not the routine of Steps (25)→(26)→(27)→(28) has already been executed N times. If YES, the process proceeds to RET, and this subroutine is ended. If NO is the answer in Step 28, the process proceeds to Step (25), and the processing with respect to subsequent M is executed.

In Step (26), the width of significant picture elements of the window M, i.e., X(M, 1) to X(M, 0), is known from the window X-coordinate data storing area 61 with respect to the area VVSB in which is stored the present measured data obtaied by scanning with the one-dimensional line image sensor 44. Then, the number of significant bits is counted in that range, and the area of the window M is calculated and added to AREA(M). By this processing, significant bits alone are counted in each individual window which is defined between the Y-coordinate section along a coordinate axis parallel to the conveyor traveling direction and the X-coordinate section along a coordinate axis parallel to the direction of scanning by the one-dimensional line sensor 44.

It should be noted that VVSB(k) is data which is disposed in the RAM 53 (where K=1, 2, ... 2,048) and which is obtained by copying VVS(k) transferred to the VIDEO-RAM 50 by DMA in accordance with a subroutine (a program in a measurement processing shown in FIG. 22, described later). This data is used to allow a subsequent DMA transfer to be executed during the processing.

Figure 22:
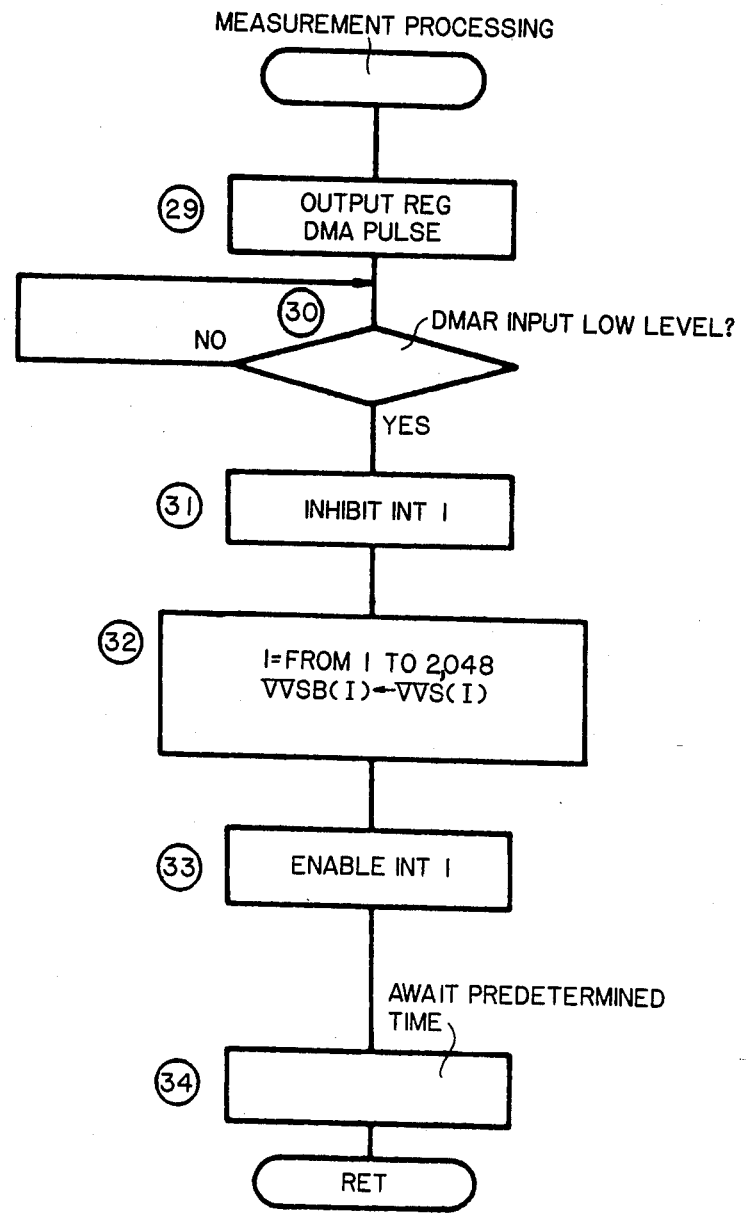

FIG. 22 shows a subroutine (a flowchart showing the measurement processing). In the measurement processing, measured data is fetched to the VIDEO RAM 50 at all times and copied or written into the RAM 53.

In Step (29), a DMA request signal pulse REQDMA is output to the DMA controller 46. In response to the rise of this pulse output 57, the DMA controller 46 raises the DMA response signal DMAR to the high level and holds this high level state until the DMA data transfer is completed. The process, therefore, proceeds to Step (31) after it has been judged in Step (30) that the signal DMAR has been changed to the low level.

In Step (32), VVS(I) is copied to VVSB(I), from I=1 to I=2,048. In order to avoid that INT1 is input during the copying operation and VVSB(I) is thereby read out before being completely changed, interrupts are temporarily inhibited in Step (31), and after the copying operation has been completed, the interrupts are enabled in Step (33). A predetermined period of time is awaited in Step (34) for the purpose of thinning out the DMA transfer and thereby balancing the interrupt processing.

Figure 23:
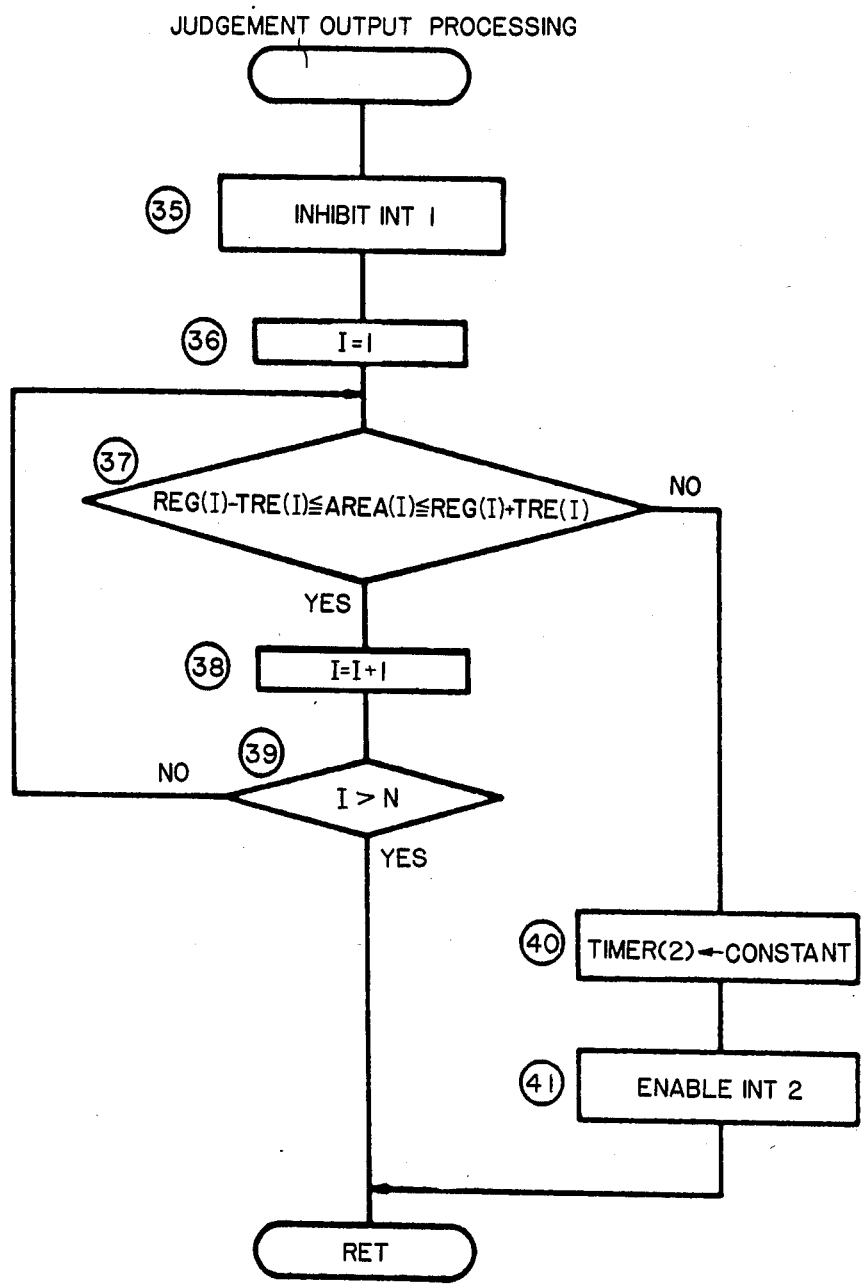

FIG. 23 shows a subroutine (a flowchart showing judgment output processing). This routine is called immediately after the product 32 has passed the visual field 35. Therefore, in order to suspend the measurement, the interrupt INT1 is inhibited in Step (35). The affix I is set at an initial value 1 in Step (36) for the purpose of repeating the following Steps (37)→(38)→(39) N times. Judgement is made in Step (37) with respect to the window measured data AREA(I) (where I=1, 2 ... N) of the product 32 which has passed the visual field 35, that is, judgement is made as to whether or not the data AREA(I) falls in the range of the reference value+the permissible error, i.e., REG(I)±TRE(I). If NO, the product 32 is judged to be defective, and the process then jumps to Step (40).

If YES is the answer in Step (37), the process proceeds to Step (38) where I is incremented by 1, and the judgement made in Step (37) is continued until I exceeds N (Step 39). The process proceeds to RET only when all the window measured values are judged to be good, and the processing of this subroutine is ended.

In Step (40), a constant is set in TIMER(2). This is a waiting time which the product 32 transported by the belt conveyor takes to reach the position in front of the air cylinder 41, and the interrupt INT2 is enabled (Step 41) for counting TIMER(2). The constant is larger than 1.

Figure 24:
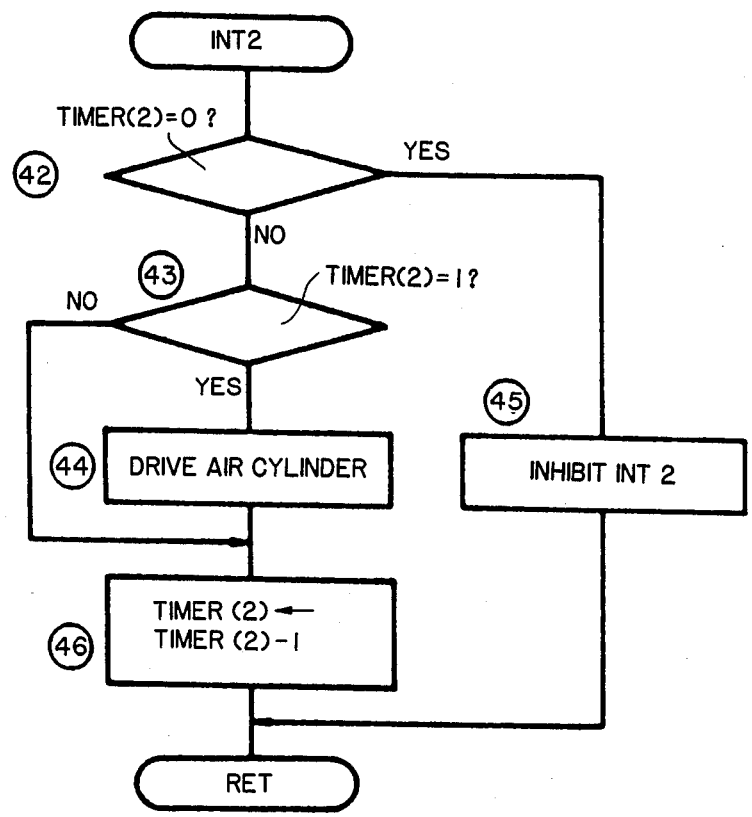

FIG. 24 shows the flowchart of the interrupt processing INT2. Judgement is made in Step (42) as to whether or not TIMER(2)=0. If YES, the process proceeds to Step (45) where the interrupt INT2 is inhibited and thereafter, the routine of the interrupt INT2 is not executed until it is enabled again in accordance with the program (see FIG. 23) in the judgement output processing executed as a subroutine.

Judgement is made in Step (43) as to whether or not TIMER(2)=1. If YES, the air cylinder is actuated (Step 44), and TIMER(2) is counted down in Step (46). If NO is the answer in Step (43), it is judged that the product 32 has not yet been transported to the position in front of the air cylinder, and the process jumps to Step (46).

As has been described above, according to the second embodiment of this application, a two-dimensional window area is formed by the window W-coordinate data stored in the area 61 and the window Y-coordinate data stored in the area 62, and a predetermined X-coordinate data is selected from the X-coordinate data group stored in the area 61 in accordance with the window work area 68, thereby allowing an addition processing of significant bits on the basis of pulses output from the rotary encoder 39. It is therefore possible to effect a two-dimensional window image processing by a relatively inexpensive one-dimensional image sensor.

It should be noted that the rotary encoder 39 is not always necessary and may be replaced by a constant-period clock, provided that the conveyor 32 moves at a satisfactorily uniform speed or rate.

Further, the SAMP signal, which represents the fact that the product (article) 32 has entered the visual field 35, is not always required either. For example, it may be judged that the product 32 is within the visual field 35 from the binary-coded video data VVS(I) in place of the SAMP signal.

In addition, it is not always necessary for the conveyor traveling direction to be set so as to be perpendicular to the axis of the one-dimensional line sensor, and the movement of the conveyor is not necessarily limited to the linear motion. For example, if the locus of movement of the conveyor is semicircular, the geometry of windows may be represented by polar coordinates, and in such case, it is possible to form a unique window which cannot readily be obtained in the case of employing a two-dimensional camera.

ADVANTAGES OF THE INVENTION

As will be clear from the above description, it is possible, according to the present invention, to divide serial data into areas having any desired length, count the number of significant bits in each of the divided areas in a real-time manner, and write the counted number of significant bits into an external memory. Therefore, the division processing of serial data, which has heretofore been effected by means of software alone, is completed simultaneously with data transfer, and the software is only required to write the result of counting. As a result, the speed of processing the whole serial data is remarkably increased. It is therefore advantageously possible to carry out a complicated quality judgement at sufficiently high speed even when an article being transported at high speed is inspected by imaging it by an image sensor.

The serial data processing apparatus according to the present invention may be employed to handle not only video data in the inspection of products also, e.g., data in the field of serial data communication. In such case, it is possible to demodulate a digital code modulated using divided visual field data in a real-time manner, so that the present invention can contribute to increasing the speed of serial data communication in a manner similar to that in the case of video data.

I claim:

1. A serial data processing apparatus for use in an inspection in which a window area is set in advance in a visual field through which it is possible to view an article which is moved relative to an imaging device along a predetermined direction and a video output in relation to said article within said window area is obtained by said imaging device and compared with a given reference value, thereby making judgment as to whether said article is good or not, said apparatus comprising:

a one-dimensional imaging device serving as said imaging device and adapted to effect scanning for one line along an X-direction insersecting a Y-direction, sequentially to decompose the image of said article into picture elements and, to convert them into time-series binary signals and output them in the form of serial data;

first storage means for storing an X-coordinate section of said window area in advance;

second storage means for storing a Y-coordinate section of said window area in advance; and video output preparing means which monitors the change of the relative position in the Y-direction between said article and said one-dimensional imaging device, and when it detects that the Y-coordinate of said imaging device is within the Y-coordinate section of a window area stored in said second storage means, this video output preparing means is supplied the X-coordinate section of the window area concerned from said first storage means, and said means take out and examines the data within the X-coordinate section of this window area in the serial data output from said one-dimensional imaging device, counts the number of bits of the data which take a predetermined logical value for each scanning and then sequentially adds the counted values to prepare a video output for said window area.

2. A serial data processing apparatus according to claim 1, wherein said window area includes a plurality of window areas, said video output preparing means being adapted to prepare a video output for each of the window areas.

3. A serial data processing apparatus for use in an inspection of an article being moved along a conveying line in a predetermined direction relative to an imaging device, in which said imaging device provides a video output corresponding to an image of said article within a predetermined window area and said video output is compared with a given reference value to permit a determination as to whether or not said article passes the inspection, said apparatus comprising:

a one-dimensional imaging device serving as said imaging device for scanning one line along an X-direction and decomposing the scanned line into a plurality of picture elements;

means for converting said plurality of picture elements into corresponding serial data;

first storage means for storing X-coordinates of said window area;

second storage means for storing Y-coordinates of said window area;

position encoding means for providing a train of pulses at a rate proportional to the speed of the conveying line;

coordinate data comparing means for counting the train of pulses provided by the position encoding means to obtain a relative distance between the article being moved along the conveying line and the one-dimensional imaging device, said coordinate data comparing means making a comparison between the obtained distance and the Y-coordinates of the window area in said second storage means to generate a Y-window signal when the values being compared coincide with each other;

counting means for examining the serial scanning data obtained by each scanning operation of the one-dimensional imaging device only when a Y-window signal is received from the coordinate date comparing means, to detect significant picture element data by taking the AND function of the serial scanning data and the X-coordinate data from the first storage means, and to count the number of bits of such data; and adding means for taking the sum of the number of bits of significant picture element data counted by the counting means in each scanning operation carried out within the window area and storing the sum in holding means.

4. The serial data processing apparatus of claim 3 wherein the said first storage means comprises first and second registers in which are stored the maximum and minimum X-coordinates of the window, respectively; and wherein the said second storage means comprises third and fourth registers in which are stored the maximum and minimum Y-coordinates of the window.

5. The serial data processing apparatus of claim 3 wherein the one-dimensional imaging device is oriented substantially perpendicularly to the predetermined direction of the conveying line.

* * * * *